US012638820B2

(12) United States Patent
Pizzato

(10) Patent No.: US 12,638,820 B2
(45) Date of Patent: May 26, 2026

(54) MULTILEVEL DETECTION DEVICE FOR SAFETY APPARATUSES FOR THE CONTROL OF INDUSTRIAL MACHINES OR PLANTS

(71) Applicant: PIZZATO ELETTRICA S.R.L., Marostica (IT)

(72) Inventor: Giuseppe Pizzato, Marostica (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 360 days.

(21) Appl. No.: 17/917,936

(22) PCT Filed: Apr. 14, 2021

(86) PCT No.: PCT/IB2021/053079

§ 371 (c)(1),
(2) Date: Oct. 9, 2022

(87) PCT Pub. No.: WO2021/209924

PCT Pub. Date: Oct. 21, 2021

(65) Prior Publication Data

US 2023/0084053 A1 Mar. 16, 2023

(30) Foreign Application Priority Data

Apr. 14, 2020 (IT) ........................ 102020000007888

(51) Int. Cl.
*G05B 19/406* (2006.01)

(52) U.S. Cl.
CPC .. *G05B 19/406* (2013.01); *G05B 2219/50193* (2013.01)

(58) Field of Classification Search
USPC ........................................................... 700/28
See application file for complete search history.

(56) References Cited

U.S. PATENT DOCUMENTS

| | | | | |
|---|---|---|---|---|
| 2007/0126576 A1* | 6/2007 | Script | ................. | G08B 19/005 |
| | | | | 340/545.5 |
| 2009/0072631 A1* | 3/2009 | Iida | ......................... | B25J 21/00 |
| | | | | 705/1.1 |
| 2009/0146506 A1* | 6/2009 | Iida | ...................... | B30B 15/285 |
| | | | | 307/328 |
| 2011/0204729 A1* | 8/2011 | Lorenz | ................ | H01H 47/004 |
| | | | | 307/326 |

(Continued)

*Primary Examiner* — Mohammad Ali
*Assistant Examiner* — Joshua T Sanders
(74) *Attorney, Agent, or Firm* — Rivka Friedman

(57) ABSTRACT

A detection device for safety apparatuses for the control of industrial machines or plants comprises a reading head adapted to be associated with the receiving device of the safety apparatus to receive a presence signal provided with the identification code following the positioning of one of the movable actuators at a predetermined minimum distance from said reading head, a processing circuit integrated in said head and adapted to generate a plurality of output signals corresponding to respective command or signalling functions for one or more parts of the machine or plant, wherein the processing circuit is adapted to associate to each of said identification signals a personalized combination of said output signals for the execution of respective combinations of said functions differentiated for one or more of said movable actuators.

9 Claims, 3 Drawing Sheets

(56) References Cited

U.S. PATENT DOCUMENTS

| | | | |
|---|---|---|---|
| 2012/0025964 A1* | 2/2012 | Beggs | G08G 1/166 |
| | | | 340/435 |
| 2014/0200687 A1* | 7/2014 | Stegmaier | G05B 9/03 |
| | | | 700/79 |
| 2014/0300412 A1* | 10/2014 | Pizzato | H03K 17/60 |
| | | | 327/574 |
| 2019/0116105 A1* | 4/2019 | Steiner | H04L 67/12 |
| 2020/0368914 A1* | 11/2020 | Schröder | B25J 9/1697 |

* cited by examiner

| Movable | Action | | | | |
|---------|--------|------|---------------|-------|------|
| actuator | OS1 | OS2 | O3 | LED | ... |
| 14 | ON | ON | OFF | BLUE | ... |
| 15 | OFF | OFF | Tx (String 1) | RED | ... |
| 16 | ON | ON | Tx (String 2) | GREEN | ... |
| ... | ... | ... | ... | ... | ... |

MULTILEVEL DETECTION DEVICE FOR SAFETY APPARATUSES FOR THE CONTROL OF INDUSTRIAL MACHINES OR PLANTS

TECHNICAL FIELD

The present invention finds application in the field of electrical devices for industrial use and has particularly as its object a multilevel detection device for safety apparatuses designed to control an industrial machine or plant, in particular of the moving parts thereof, such as the accesses to a safety perimeter.

The invention also relates to a safety apparatus comprising one or more of such detection devices and designed to control a machine or industrial plant.

STATE OF THE ART

As known, industrial machines and plants are commonly provided with a variety of controls which allow to intervene on one or more functions following the reception of certain signals by the control systems in charge.

Purely by way of example, the detection of the signal may involve effects such as stopping or starting one or more parts, in an instant or timed manner, the modification of the behavior of one or more parts of the machine or plant, the generation of signals warning or alarm, either visual or luminous or audible type.

In general, it is possible to distinguish the control systems into two types, depending on whether they are delegated to the management of standard type functions or to so-called fail-safe or safety functions, i.e. applications relating to conditions that could potentially cause risk.

Typical examples of these control systems are the safety devices associated with safety panels and perimeters and used for access control within the operating area, such as in particular the safety switches designed to generate a machine stop at the opening of the controlled access.

A further type of apparatus is constituted by safety sensors used to detect specific movements of one or more parts of the machine or plant and which, if they are of the fail-safe type, must determine the stop of the machine upon detection of even a single anomaly.

The most advanced types of these safety devices, whether they are switches or sensors, are usually provided with a reading head susceptible of receiving the signal from a movable element, such as the access door or a movable element of the machine or plant, so as to discriminate the presence of this part and determine if the safety condition has occurred.

The most common systems for sending signals are RFID-type systems, wherein the RFID signal is transmitted by a transponder associated with the movable part and is also associated with a unique code adapted to be read by an evaluation unit connected to the reading head.

This aspect has the purpose of performing a detection function suitable to ensure that the transponder that communicates with the reading head is enabled to send that signal, avoiding that there may be interventions by unauthorized persons.

In this way, the evaluation unit may use the signals and the related univocal identification codes to establish which transponder is in proximity to a given reading head and establish which actions are authorized for that transponder and the relative movable part, so as to generate the expected effect.

These reading and recognition systems may also be designed to interact with a transponder associated with a transportable type actuator, such as a token or similar, in the possession of an operator.

In this way, an authorized operator, by approaching the token or other device equipped with the transponder, may send the identification signal to the evaluation unit which, only if it recognizes the identification code, will proceed with the action provided for that specific code.

U.S. Pat. No. 9,423,784 discloses a system for detecting the safe installation state of an automated system provided with a plurality of sensors suitable for discriminating different conditions of the system, both of the standard type and of the fail-safe type, so as to generate different actions based on to the type of the detected signal.

In particular, the system is provided with both sensors having a reading head for receiving signals relating to unsafe conditions and sensors used for receiving signals relating to safety functions.

Furthermore, the sensor used for fail-safe functions may also communicate with a token operated by an operator, so as to verify whether or not this operator is authorized to enter the safety perimeter of the system, authorizing access in the positive case and consequently causing the stop of the machine.

The sensors are connected to the same control unit adapted to discriminate the type of sensor and consequently sending a signal to the system based on the input received.

A limitation of the known solutions is however constituted by the fact that the reading heads are enabled to recognize a single identification code or even more identification codes, but always generating the same action, so that the final output is always the same.

On the contrary, it is not possible to program the device used for receiving the signal to generate different actions according to the code of the input signal.

From the state of the art, systems for managing access to a work area are also known wherein the authorization to enter the work area is produced in function of a plurality of codes present on a tag provided to the operator and which define the authorization thereof to access the area and the degree of skill of the operator in order to allow or not certain actions according to the levels of skill.

It follows that these systems, in addition to being aimed exclusively at operator management and do not allow customizable management of the outputs, do not provide for the possibility of modifying the outputs according to the detected codes but simply enable or not certain functions according to the detected code.

For example, US2009/072631 discloses an operator safety management system that consists of various elements, including TAGs, TAG readers and an analysis PLC.

The information contained in the TAGs is never evaluated by the TAG reader, i.e. by a sensor placed at the access, which therefore does not change its behavior according to the detected TAG, but is transmitted to the PLC which performs different operations. Instead, it is always the PLC that evaluates the data and decides how to act accordingly.

SCOPE OF THE INVENTION

The object of the present invention is to overcome the above drawbacks, realizing a detection device for safety apparatuses designed to control industrial machines or plants which has features of high efficiency and relative cost-effectiveness.

A particular object is to provide a detection device for safety apparatuses for controlling industrial machines or plants whose behavior is adapted according to the input signal.

Still another object is to provide a detection device for safety apparatuses for controlling industrial machines or plants which allows to detect different input signals and to associate a different output to each of them.

Still another object is to provide a detection device for safety apparatuses for controlling industrial machines or plants which is of the user programmable type.

These objects, as well as others which will become more apparent hereinafter, are achieved by a detection device which, according to claim 1, may be associated with a safety apparatus which comprises a receiving device adapted to be associated with a fixed part of a system or of its safety perimeter and a plurality of movable actuators each adapted to send to the receiving device a respective presence signal provided with its own identification code, which detection device comprises a reading head adapted to be associated with the receiving device of the apparatus to receive a presence signal provided with the identification code following the positioning of one of the movable actuators at a predetermined minimum distance from said reading head and a processing circuit integrated in said head and adapted to generate a plurality of output corresponding to respective command or signaling functions for one or more parts of the machine or plant, the processing circuit being adapted to associate to each of said identification signals a customized combination of said output signals for the execution of respective combinations of said differentiated functions for one or more of said mobile actuators.

Thanks to this combination of features, the same detection device placed on a certain part of the plant, for example integrated into a switch or sensor, will be adapted to send different signals based on the detected identification code.

This peculiarity will allow to set different responses according to the detected code, allowing, for example, to associate different behaviors to different positions of a movable part of the machine or plant.

A typical example, not limiting for the invention, could be that according which two RFID tags in opposite positions may be associated to a movable part of the plant, such as a sliding door, so that the detecting of one or the other tag may be associated to a different state of the movable part and consequently to a different operating mode of the safety apparatus.

Advantageous embodiments of the invention are obtained in accordance with the dependent claims.

BRIEF DISCLOSURE OF THE DRAWINGS

Further features and advantages of the invention will become more apparent in the light of the detailed description of some preferred but not exclusive embodiments of systems which integrate one or more devices according to the invention, illustrated by way of non-limiting example with the aid of the attached drawing tables wherein:

FIG. 1 is a schematic view of an industrial plant equipped with a safety perimeter and which the device according to the invention is applied to;

FIG. 2 is a schematic front view of a robotic arm which the device according to the invention is applied to;

BEST MODES OF CARRYING OUT THE INVENTION

Figure 1:
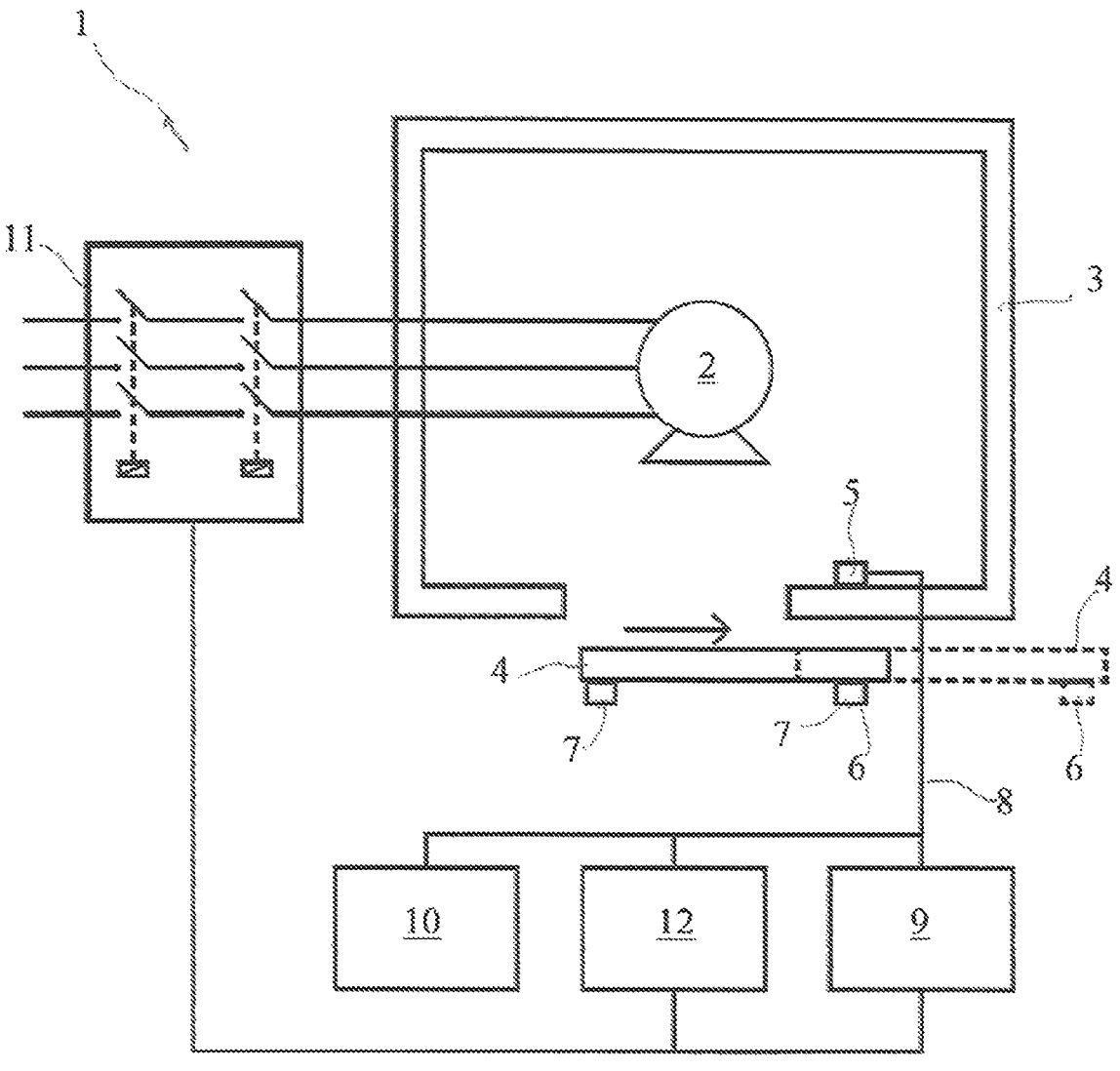
Figure 2:
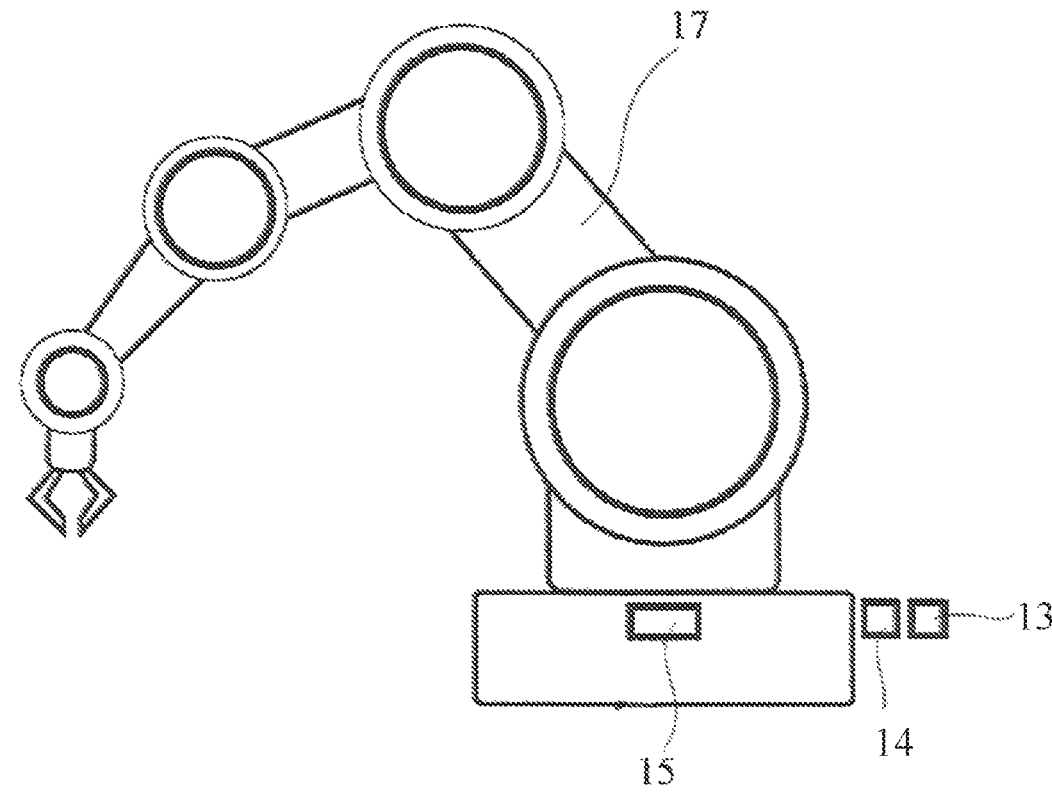

A multi-level detection device for safety apparatuses according to the invention will be designed to be associated, in particular, with a safety equipment used to control industrial machines or plants, or parts thereof.

By way of example, the safety apparatus equipped with the detection device may be associated with movable parts of the plant and therefore intrinsically dangerous or with panels, safety barriers or other systems used to control the safety perimeter in order to always allow safe access within the perimeter, according to the methods explained in more detail below.

In a further application one or more detection devices are applied to machines provided with movable parts so as to have a sensor placed on the fixed part and one or more actuators placed on the dangerous movable parts, as will become clearer later on.

In its most general configuration, the safety apparatus comprises a receiving device adapted to be associated with a fixed part of a plant or its safety perimeter and a plurality of movable actuators which are adapted to be applied to movable parts of the machine or plant or of the possible protection barrier.

These movable parts are adapted to interact selectively with the receiving device to send it a respective presence signal provided with its own identification code, so that this interaction produces the sending of certain output signals suitable to control corresponding parts of the machine or plant or control circuits, such as power and/or service circuits.

In turn, the recognition device essentially comprises a reading head adapted to be associated with the receiving device of the safety apparatus to receive a presence signal provided with the identification code from one of the actuators interacting each time with the receiving device, following the positioning of this movable actuator at a predetermined minimum distance from the reading head.

The reading head is provided with a processing circuit integrated thereinside and adapted to generate a plurality of output signals corresponding to respective command or signalling functions for one or more parts of the machine or plant.

In particular, according to a peculiar feature of the invention, the processing circuit is adapted to associate a customized combination of the output signals stored thereinside with each of the identification signals.

In this way, each actuator will be associated with a specific combination of functions, possibly even a single function, to be activated for one or more parts of the machine or plant and/or the related control, power and/or service circuits, for the execution of combinations of differentiated functions for one or more of the movable actuators.

The functions managed by the device can be both of an unsafe or standard type, i.e. relating to actions that do not involve risks for the operators but possibly only production defects, and functions of a safe or fail-safe type, i.e. functions that require stopping of the machine or plant, or parts thereof, before allowing the access of an operator within the perimeter.

The processing circuit may be provided with a pre-set scheme during the production step but, more preferably, it will be of the type programmable by the user or by the manufacturer, so that each user can associate a specific operating mode to each position of the controlled movable parts according to the specific needs.

The combinations of functions that can be associated with the various signals and the respective codes will be multiple and depend on the type of machine or plant.

Purely by way of example, the command signals generated by the processing circuit may be commands for activating/deactivating one or more outputs, both standard and safe, activation of light, visible and/or audio signals, activation or deactivation of OSSD (Output Signal Switching Device) outputs and simultaneous transmission on a one-way or two-way serial output or on a one-way or two-way safety bus of a code to distinguish the different actuators.

In a first typical application, the detection device is associated with a safety apparatus of the safety switch type adapted to be placed at an access of the safety perimeter of the machine or plant and provided with switching means suitable for switching one or more parts of the machine or plant from an operative condition to an inoperative condition following the opening and closing of the access controlled by said safety switch.

An example of this safety switch is disclosed in WO2017208124 or in WO2018055598, always in the name of the same applicant, wherein the switch is also provided with a door locking mechanism.

In such applications, the receiving device is adapted to be anchored to a fixed part of the access to be controlled while one of the actuators is adapted to be anchored to the movable part of the access.

The receiving device comprises switching means adapted to be operatively connected to one or more electrical and/or electronic circuits for powering and/or controlling the main circuit and/or service and emergency circuits and/or supervision or control systems of the access to hazardous areas.

The switching means may be selected from those commonly used in the field and may also vary depending on the functionality of the switch, without particular limitations. The receiving device will also comprise operating means adapted to interact with the switching means upon opening/closing the access for opening/closing one or more circuits of the machine or plant following the interaction between the switching receiving device and one of the actuators, also in this case according to known techniques.

In particular, the actuator placed on the movable part will be designed to interact with the switching means through the operating means following the opening or closing of the access to determine the opening or closing of one or more circuits according to typical ways for such safety switches.

According to a particularly preferred embodiment, the reading head houses a receiver with an antenna of the RFID type (Radio Frequency Identification) while the actuators will be transponders of the tag/RFID type adapted to send the respective presence signal.

Alternatively, instead of the transponders and the RFID antenna, it will be possible to use communication systems selected among the data transmission devices operating via radio, via Hall effect, via magnetic fields, via ultrasound or similar.

A second particularly preferred embodiment instead provides that the receiving device is a sensor or is integrated inside a sensor, for example of the type described in WO2013098788, provided with said integrated reading head, while the actuators will always be associated with one or more movable parts of a machine or plant.

It follows that the information contained in the tags is evaluated by the sensor placed at the access, which therefore will directly vary its behavior depending on the detected tag.

Also in this case, in the preferred embodiment, the reading head will include an RFID antenna while the actuators will be RFID tags.

FIG. 1 shows a first application of the device according to the present invention.

In particular, a system 1 is shown which comprises a machine 2 placed inside a barrier or protection perimeter 3 provided with a movable access 4 associated with the detection device according to the invention.

In this case, the detection device comprises a fixed sensor or reading head 5 placed on a fixed part of the barrier 3 to interact selectively with two movable sensors 6, 7 placed on the access 4 in positions such as to discriminate two different positions of the access 4, i.e. that of closing and that of complete opening.

In this embodiment, the detection device is connected, by means of a bus 8, to a mt 9 for supervision and control of the access 4, possibly equipped with PLC 10 for its programming, i.e. to the security system responsible for verifying that all safety conditions are observed to interact with the power and/or signalling circuits 11 of the machine 2, so as to intervene on them and interrupt the operation of the machine 2 or its parts if unsafe conditions are detected or send predetermined signals.

In the example of the figure, a possible operating mode provides that the opening of the access 4, for example to allow the entry of one or more operators inside the perimeter 3, determines the interruption of the communication between the fixed sensor 5 and the first movable actuator 6, with consequent machine stop.

The complete opening of the access 4 brings the second movable actuator 7 in correspondence with the fixed sensor 5, allowing the operators to insert, in a suitable safe control unit 12 of the access 4, also connected with the power and/or signal circuits 11, their own tag or identification code in order to perform some actions on the machine 2, such as slow safe movements or the connection of an enabling switch or still other safe operations.

In this condition, access 4 will remain open to always allow the exit of operators from perimeter 3.

To avoid accidental or negligent closing of access 4 when the operators are still inside the perimeter 3, with consequent restart of the machine 2 in unsafe conditions, the fixed sensor 5, upon detection of the absence of contact with the second movable actuator 7, will block all slow movements and will ask the safe control unit 12 for the tags of all the operators entered, in order to allow the restart of the machine 2 only after having received all the aforementioned tags and be sure that all operators have left the perimeter 3.

The secure control unit 12 of the access 4 may be a unit distinct from the various sensors, as in the figure, or it may be integrated into the fixed sensor 5.

Figure 3:
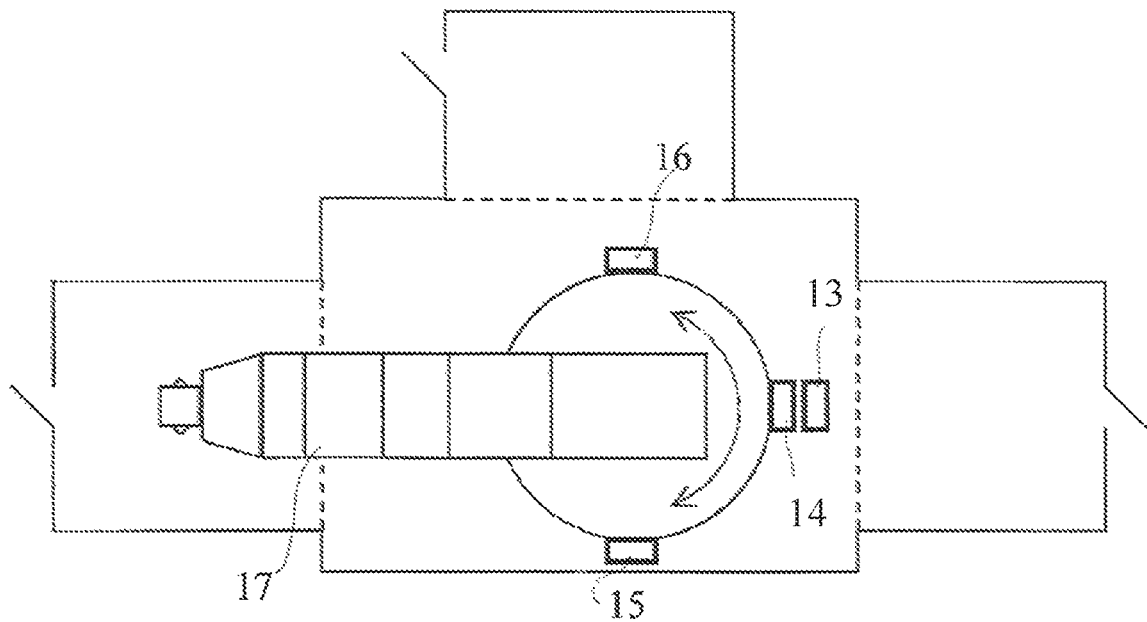
FIG. 3 is a schematic top view of the robotic arm of FIG. 2.

In FIG. 3, on the other hand, an application is shown wherein the device of the invention is applied to a robotic arm.

In this application, the device has a fixed sensor 13 adapted to selectively dialogue with three distinct movable actuators 14, 15, 16 associated with different parts of the movable arm 17 so that each position of the arm 17 corresponds to an interaction of the fixed sensor 13 with a different movable actuator and a consequent action.

Figure 4:
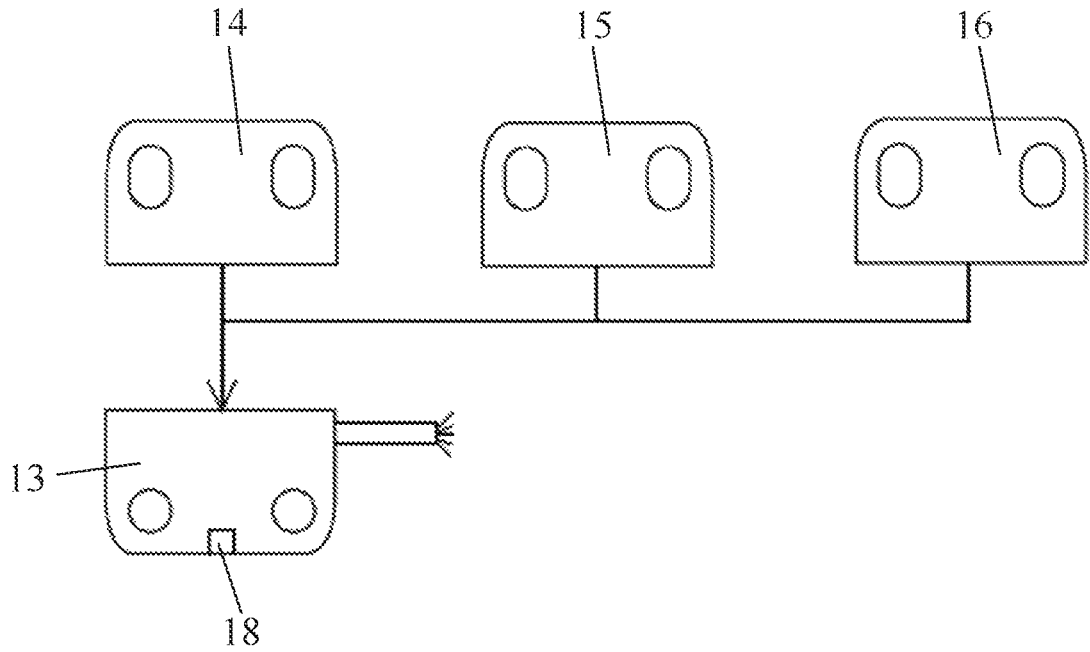
FIG. 4 is a schematic operating sequence of the device with the relative table illustrating the commands associated with each position.

The table of FIG. 4 describes possible actions associated with the interactions between the fixed sensor 13 and the different movable actuators 14, 15, 16.

For example, the interaction between the fixed sensor 13 and the central movable actuator 14 may produce the activation of the two outputs OS1 and OS2 and consequent operation of the machine, while the auxiliary signalling output O3 will be off. The signalling light 18 present on the fixed sensor 13 may turn into a first color. Following a rotation of the arm 17 which brings one of the two movable lateral actuators 15 at the fixed sensor 13, which for example may correspond to an unsafe condition of the movable arm 17, the two outputs OS1 and OS2 can be deactivated and the sending of a signal on the auxiliary output O3, configured as a serial bus, may occur with the possible generation of a text string and different coloring of the signalling light 18 present on the fixed sensor 13.

In the event of a rotation of the arm 17 in the opposite direction so as to bring the other of the two movable lateral actuators 16 in correspondence with the fixed sensor 13, which, for example, may correspond to a safe condition of the movable arm 17, it is possible to have an activation condition of the two outputs OS1 and OS2 and the sending of a signal on the auxiliary output O3, with the possible generation of a further text string and contextual still different coloring of the signalling light 18 placed on the fixed sensor 13.

Obviously, the number of movable actuators may also be different, for example greater, in order to discriminate a different number of positions of the movable part of the system and to associate a specific combination of behaviours to each of them, also according to schemes that may be customized by the end user or manufacturer.

The invention claimed is:

1. A safety apparatus for controlling machines or industrial plants, comprising:
   a receiving device adapted to be placed at a fixed part of a machine or plant or a protective barrier of the machine or plant;
   a plurality of movable actuators adapted to be applied to movable parts of the machine or industrial plant and each adapted to selectively interact with said receiving device to send to it a respective presence signal provided with its own identification code; and
   a detection device associated with said receiving device and having a reading head adapted to receive said presence signal provided with said identification code following the positioning of one of said movable actuators at a predetermined minimum distance from said reading head and a processing circuit integrated in said reading head and adapted to generate a plurality of output signals corresponding to respective command or signaling functions for one or more parts of the machine or plant;
   wherein said processing circuit is configured to associate to each of said identification signals a personalized combination of said output signals stored there inside for the execution of respective combinations of said command or signaling functions for one or more of said movable actuators.

2. The security apparatus as claimed in claim 1, wherein said receiving device is selected among safety proximity switches and safety proximity sensors, whether or not equipped with a door locking mechanism.

3. The security apparatus as claimed in claim 2, wherein said receiving device is a sensor provided with said integrated reading head, said actuators being associated with one or more moving parts of a machine or plant.

4. The security apparatus as claimed in claim 2, wherein said receiving device is a safety switch adapted to be placed at an access of the safety perimeter of the machine or plant and provided with switching means suitable for switching one or more parts of the machine or plant between an operating state and a non-operating state following the opening and closing of the access manned by said safety switch.

5. The security apparatus as claimed in claim 1, wherein at least one of said movable actuators is associated with a movable part of the security perimeter adapted to close said access to send its presence signal to said safety reading head upon the closure of the access.

6. The security apparatus as claimed in claim 1, wherein each of said movable actuators comprises a respective tag or radio frequency identification (RFID) transponder adapted to send the respective presence signal or a transmitter of a data transmission device operating via one or more of radio, Hall effect, magnetic fields, or ultrasound.

7. The safety apparatus as claimed in claim 1, wherein said processing circuit is programmable and customizable by the user and/or the manufacturer.

8. The safety apparatus as claimed in claim 1, wherein said processing circuit is adapted to activate or not the output signal switching device (OSSD) outputs of said plant and to transmit, on a serial output or safety bus, a code to distinguish the different actuators.

9. The safety apparatus as claimed in claim 1, wherein said reading head houses a receiver selected from the group consisting of: radio frequency identification (RFID) antennas, magnetic or electromagnetic sensors, optical sensors, radio, Hall effect, and ultrasound.

\* \* \* \* \*